(12) United States Patent
Dressler

(10) Patent No.: US 11,000,973 B2
(45) Date of Patent: May 11, 2021

(54) METHOD AND DEVICE FOR PRODUCING POWDERY SUBSTANCES FROM PLASTIC

(71) Applicant: Dressler Group GmbH & Co. KG, Meckenheim (DE)

(72) Inventor: Axel Dressler, Alfter (DE)

(73) Assignee: DRESSLER GROUP GMBH & CO. KG

( * ) Notice: Subject to any disclaimer, the term of this patent is extended or adjusted under 35 U.S.C. 154(b) by 38 days.

(21) Appl. No.: 16/479,422

(22) PCT Filed: Jan. 9, 2018

(86) PCT No.: PCT/EP2018/050468
§ 371 (c)(1),
(2) Date: Jul. 19, 2019

(87) PCT Pub. No.: WO2018/134087
PCT Pub. Date: Jul. 26, 2018

(65) Prior Publication Data
US 2019/0358856 A1    Nov. 28, 2019

(30) Foreign Application Priority Data

Jan. 19, 2017    (DE) ..................... 10 2017 100 981.7

(51) Int. Cl.
*B29B 9/12*    (2006.01)
*B01J 2/02*    (2006.01)
(Continued)

(52) U.S. Cl.
CPC ................... *B29B 9/12* (2013.01); *B01J 2/02* (2013.01); *B29B 9/02* (2013.01); *B29B 9/06* (2013.01);
(Continued)

(58) Field of Classification Search
None
See application file for complete search history.

(56) References Cited

U.S. PATENT DOCUMENTS 4,358,415 A * 11/1982 Tachimoto ................ C21B 3/08
264/8
5,346,377 A * 9/1994 Bogue ...................... A23G 3/10
264/40.4
(Continued)

FOREIGN PATENT DOCUMENTS

| CN | 104667823 A | 6/2015 |
| CN | 204564050 U | 8/2015 |

(Continued)

OTHER PUBLICATIONS

International Search Report for Application No. PCT/EP2018/050468, dated May 2, 2018, 3 pages.
(Continued)

*Primary Examiner* — Mary Lynn F Theisen
(74) *Attorney, Agent, or Firm* — McCarter & English, LLP

(57) ABSTRACT

The invention relates to a method for producing powdery plastic particles having as spherical a structure as possible, wherein a starting product (30) made of plastic, in particular a viscous to solid starting product (30), is brought into contact with a smooth surface (24) of a body (20), which is moved at a speed v of at least 5 m/s relative to the starting product (30). In the contact area (34) between the starting product (30) and the body (20), the starting product (30) is heated locally, and is flung in powdery form out of the contact area in the direction of movement of the body (20).

18 Claims, 1 Drawing Sheet

(51) Int. Cl.
*B29B 9/06* (2006.01)
*B29B 9/02* (2006.01)
*B33Y 70/00* (2020.01)
*B29K 71/00* (2006.01)

(52) U.S. Cl.
CPC ..... *B29B 2009/125* (2013.01); *B29K 2071/00* (2013.01); *B33Y 70/00* (2014.12)

(56) References Cited

U.S. PATENT DOCUMENTS

| | | | |
|---|---|---|---|
| 6,676,860 B1 | 1/2004 | Andersson | |
| 6,903,065 B2 | 6/2005 | Nyssen et al. | |
| 7,261,529 B2* | 8/2007 | Persyn | A61K 9/5089 264/13 |
| 2006/0016923 A1* | 1/2006 | Lee | B02C 18/144 241/294 |

FOREIGN PATENT DOCUMENTS

| | | | |
|---|---|---|---|
| DE | 202016106243 U1 | 11/2016 | |
| EP | 0945173 A1 | 9/1999 | |
| EP | 2143486 A1 | 1/2010 | |
| JP | H1086155 A | 4/1998 | |
| JP | 2004262115 A | 9/2004 | |

OTHER PUBLICATIONS

Written Opinion for Application No. PCT/EP2018/050468, dated May 2, 2018, 6 pages.
ASTM International, ASTM A 480/480A, "Standard Specification for General Requirements for Flat-Rolled Stainless and Heat-Resisting Steel Plate, Sheet, and Strip," Dec. 1, 2018, pp. 1-26.
European Committee for Standardization, DIN EN ISO 75-1, "Plastics—Determination of temperature of deflection under load—Part 1: General test method (ISO 75-1:2013)," Apr. 2013, pp. 1-15.
European Committee for Standardization, DIN EN ISO 75-2, "Plastics—Determination of temperature of deflection under load—Part 2: Plastics and ebonite (ISO 75-2:2013)," Apr. 2013, pp. 1-15.
European Committee for Standardization, DIN EN ISO 75-3, "Plastics—Determination of temperature of deflection under load—Part 3: High-strength thermosetting laminates and long-fibre-reinforced plastics (ISO 75-3:2004)," May 2004, pp. 1-8.
European Committee for Standardization, EN 10088-2, "Stainless steels—Part 2: Technical delivery conditions for sheet/plate and strip of corrosion resisting steels for general purposes," Oct. 2014, pp. 1-60.

* cited by examiner

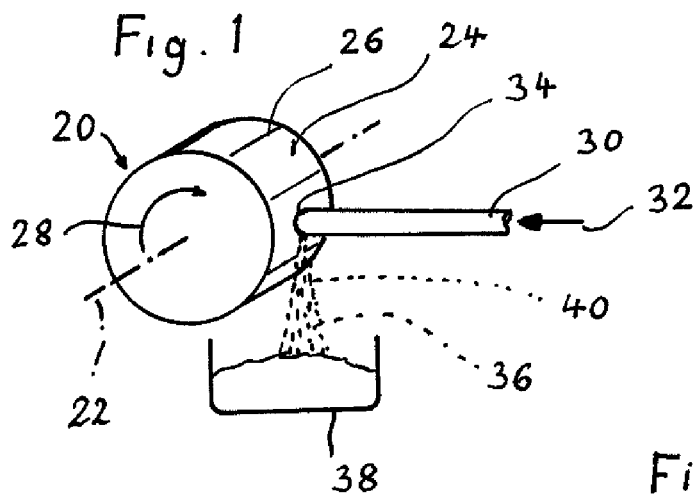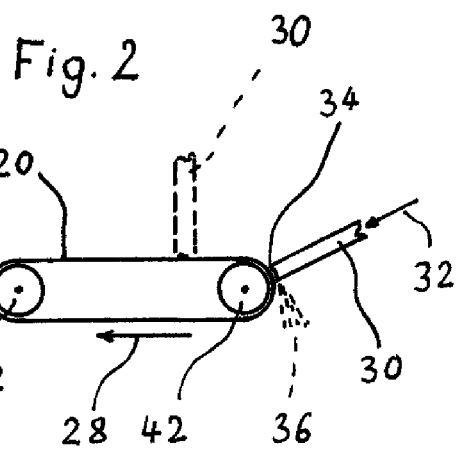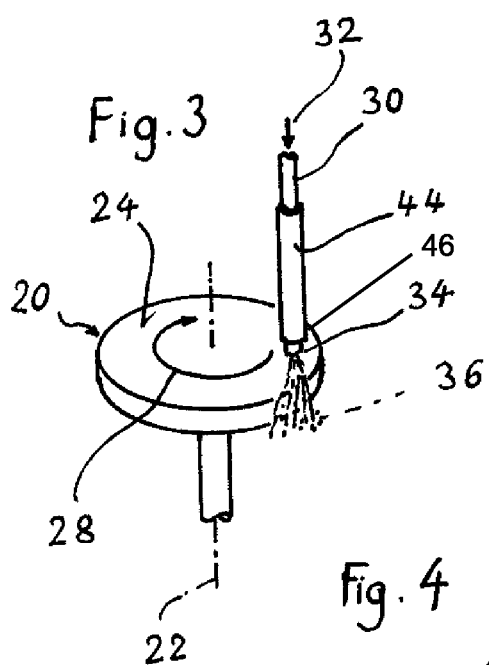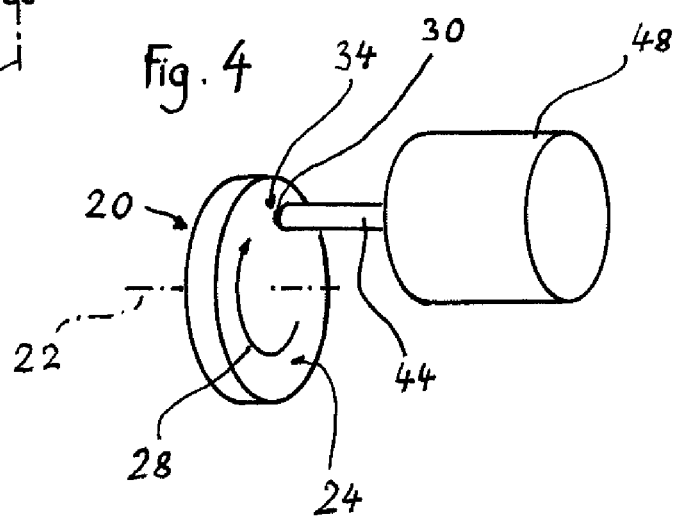

METHOD AND DEVICE FOR PRODUCING POWDERY SUBSTANCES FROM PLASTIC

CROSS-REFERENCE TO RELATED APPLICATIONS

This application is a national stage application of international application no. PCT/EP2018/050468 filed Jan. 9, 2018, entitled "Method and Device for Producing Powdery Substances from Plastic," claiming priority to German application No. DE 10 2017 100 981.7, filed Jan. 19, 2017, which are hereby expressly incorporated by reference as part of the present disclosure.

FIELD OF THE INVENTION

The present disclosure generally relates to a method and a device for producing powdery substances having as spherical a structure as possible from plastic.

BACKGROUND

Grain sizes may be smaller than 500 µm, such as smaller than 100 µm, e.g., particles in the range from 30 to 100 µm. The maximum upper limit may be specified as 800 µm. The lower limit may be in the nanometer range. The deviation from a spherical shape may be such that the smallest cross-sectional dimension of a particle is not less than 20%, preferably not less than 50%, of the size of the largest cross-sectional dimension of the same particle.

Powdery material of such kind is needed for many purposes, for example for 3D printing, for powder coating etc. The more spherical the individual particles are, the more flowable the powder is.

A device for producing powdery substances of such kind is known from German Patent No. DE 20 2016 106 243 U1. In this case, a hot molten mass of the starting product is fed to a nozzle device from which the molten mass emerges and separates into small droplets, which fall downwards. These droplets are cooled with cryogas and collected in a bottom region.

A similar device and corresponding method are also known from European Patent No. EP 945 173 B1. U.S. Pat. No. 6,903,065 B2 describes this method according to the abovementioned European patent specification EP 945 173 B1. It relates to the production of typical particle sizes from 50 µm to 300 µm, in particular larger than 100 µm.

In these methods, each plastic used as the starting product is heated up so that it can be sprayed. However, this heating process must not be continued above temperatures at which the plastic changes noticeably. Excessive heating leads to the initiation of chemical processes in the plastic which result in an unacceptable change. In this regard, the length of time for which the plastic is kept at elevated temperature also seems to be significant.

It is further known to first dissolve plastics in a solvent and to recover the particles therefrom, for example by atomizing or spraying the solution obtained and keeping the droplets obtained isolated until the solvent has substantially evaporated. With this method, it is not necessary to bring the plastic to a higher temperature, which means that chemical changes do not represent a cause for concern. However, the solvent infiltrates the plastic.

It is also not possible using the conventional methods and devices to produce plastic particles having the desired roundness.

SUMMARY

There is a need for another method of production. It is therefore an objective to describe a method with which plastic particles may be produced inexpensively and on an industrial scale which have as spherical a shape as possible. A further objective is to describe a corresponding device.

With regard to the method, this object is solved with a method for producing powdery plastic particles having a more spherical a structure, wherein a starting product made of plastic, for example a viscous to solid starting product which may be stationary, is brought into contact with a smooth surface of a body which is moved at a speed v of at least 5 m/s relative to the starting product, causing the starting product to be heated locally in the contact area between starting product and body and to be flung in powdery form out of the contact area in the direction of movement of the body.

The method adopts a new approach. The method is called "friction spraying." The starting product is brought into contact with a relatively fast moving surface of a body. The starting product as a whole does not have to be heated for this. Heating does take place, but it is limited to the very small contact area between starting product and body. In this way, in each case only a small quantity of the plastic is raised to a higher temperature at one time and only for an extremely short time, which is sufficient to pulverise it. Thus, the period in which any chemical changes can take place is limited. The likelihood that the plastic might undergo a chemical change is considerably lower than for plastic that is heated to the same temperature in the spray method according to EP 945 173 B1 for example.

Surprisingly in view of the prior art, it was found that substantially spherical plastic particles are formed in the contact area. The relative movement leads on the one hand to frictional heat, and on the other to a separation of plastic material and possibly also to a shaping, ultimately to the specific formation and shaping of small spherical particles. Finally, the relative movement has the effect of accelerating these spherical particles so that they are flung out of the contact area. The exit motion is substantially tangential, for example within an exit wedge, in at least some embodiments. The spherical particles exiting the contact area are at a considerably lower temperature than the particles leaving the nozzle in the previously known spray method. Therefore, they do not have to be specially cooled in a cooling gas or the like. Cooling takes place as the particles fly through the air on the way to a collecting vessel. Consequently, the particles in the collecting vessel are solid enough that their surfaces are no longer tacky, and therefore they do not stick together.

The method may be carried out in such a way that the plastic cannot cover or coat the surface of the body. The surface of the body may remain as pure and clean as at the start even after the method has been proceeding for a prolonged period. A number of measures can be taken to achieve this objective. The relative speed can be increased, for example, to values greater than 10 m/s or greater than 20 m/s, thereby increasing the acceleration and the centrifugal forces, which has the effect of suppressing adhesion. The surface can be smooth and constructed in such a manner that the plastic does not adhere to it. The body may be tempered, so that the risk of plastic adhering to it is generally reduced. A material may be chosen for the body and thus also for the surface such that it offers reduced affinity for adhesion by the plastic used. Additionally, the force with which the starting product is pressed against the surface of the body may be varied. In at least some embodiments, a force of at least 1 N is applied. It is more likely that smears may appear on the surface with higher forces than with lower forces. However, with higher forces the yield of plastic particles is also generally greater. Accordingly, on this point a practical value may be found. Finally, the method also varies based on the plastic used in each case. Not all plastics can or should be treated in the same way, but rather the individual parameters (relative speed, material of the body, the condition of the surface, that is to say for example its roughness, etc.) may be different for any given plastic.

It has proven advantageous to construct the body as a cylinder in at least some embodiments, which is rotated about its cylinder axis, and to bring the starting product into contact with the cylinder barrel. In the case of cylinders with a radius smaller than 10 cm, for example, smaller than 2 cm, the curvature is so steep that nothing obstructs the trajectory of the ejected plastic particles. This is not necessarily as true in the case of a flat surface. Because of the curvature, it is also simpler in at least some embodiments to collect the plastic particles in a collecting vessel and then arrange the vessel inside the device. The plastic particles are propelled out of the contact area in the form of a wedge-like jet. In at least some embodiments, they exit as an unobstructed jet.

It is advantageous in at least some embodiments to furnish the otherwise smooth surface of the body with discontinuities. In at least some such embodiments, the discontinuities are in a regular arrangement. They may be constructed as grooves or as ribs. They may be relatively short in the direction of movement, shorter than 1 mm, for example, and shorter than 0.2 mm in at least some embodiments. They may be also of limited height or depth, they may extend not more than 1 mm, or not more than 0.2 mm, upwards and/or downwards. An uninterrupted region of the surface of the body may be located between two neighboring discontinuities. This region may be at least ten times longer, for example twenty times longer, than the dimensions stated above for the discontinuity in the direction of movement.

The roughness of the surface may be of such an order that it is essentially impossible for the plastic particles produced to accumulate between adjacent tips of the surface profile. The maximum roughness Rz of the body surface is at least ten times greater than the average grain size of the plastic particles in at least some embodiments. In at least some embodiments, the maximum roughness Rz may be even at least 50 times greater.

In at least some embodiments, the starting product is located in a guide tube and is guided movably therein. It is possible also to use softer plastic masses than the starting product, for example, viscous material.

The device for producing such powdery substances from plastic has in at least some embodiments a body with a substantially smooth surface which is moved in at least some embodiments at a speed v of at least 5 m/s, and a feed device for viscous to solid starting product that is in contact with the surface in a contact area, and a collecting vessel which is positioned close to the contact area. The feed device not only serves to hold the starting product, but it also makes it possible to move the starting product towards the surface with a certain force or a certain pressure, wherein it also continues delivering fresh starting material. In this way, it can be ensured that a sufficient quantity of starting material is always in contact with the surface.

The feed device in at least some embodiments includes a guide tube, which has a free end in the immediate vicinity of the contact area. The starting product is guided movably in the guide tube. The guide tube makes it possible to use starting material which is not dimensionally stable itself. Thus, the guide tube may be dispensed with if the starting product is rigid enough not to need support.

An extruder may be provided that has an exit area close to the contact area, from which the plastic material that forms the starting product is discharged, so that this starting product is contacted with the surface. In this context, the great advantage consists in that starting product which is still warm can be pulverized immediately without cooling down in the interim period or other steps being carried out such as intermediate storage, etc. In this way, molten mass can be processed to form powder inline and thus immediately after compounding. Transportation paths are shorter, and less energy is consumed in performing the work.

It is advantageous, in at least some embodiments, if the plastic particles formed in the contact area are accelerated as rapidly as possible therein. An acceleration greater than 100 g, such as over 1000 g, is advantageous.

It may be advantageous to temper the starting product, to cool or heat it for example. For example, this may take place inside the feed device. If the condition of the starting product is specified as viscous to hard, the limit for viscous is satisfied when the starting product does not separate before it comes into contact with the surface, but the viscous starting product is still firm enough to sustain the reaction forces of the friction process that takes place in the contact area. A guide tube can serve to ensure that the reaction forces are directed over a very short distance, specifically, for example, in the clearance space between the free end of the guide tube and the surface. The guide tube absorbs most of the reaction forces in some such embodiments.

The degree of roughness of the surface can assist the powder production. The "Ra value", which corresponds to the arithmetical mean of the deviations upwards and downwards from a center line, may be less than 10 μm, for example, less than 3 μm and, in at least some embodiments, less than 1 μm. It may be smaller than the average diameter of the particles, for example, at least ten times or even 50 times smaller. Suitable surfaces include surfaces according to ASTMA A 480/48OA of at least 3, or higher, in at least some embodiments, that is to say 4, 5, or more. Suitable surfaces also include surfaces with the surface designation according to EN 10088-2 of at least 1D, for example, 2D, or higher, e.g., 2B, 2G etc.

The term "stationary" is to be understood to mean that the starting product is substantially stationary. It can be moved. It is possible to move the starting material quickly in climatic inversion, but to leave the body substantially undisturbed. Advantages are gained in terms of equipment if the starting product is not moved and the full relative movement is achieved by propulsion of the body.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Embodiments, which are not to be interpreted as limiting, are described in greater detail in the following description, with reference to the Figures, which are understood not to be limiting.

FIG. 1 schematically shows a first embodiment of a device designed for producing powder, FIG. 2 schematically shows a second embodiment, FIG. 3 schematically shows a third embodiment, and FIG. 4 schematically shows a fourth embodiment, which is similar to the third variant but has a directly attached extruder.

DETAILED DESCRIPTION

In the following section, the embodiment according to FIG. 1 will be described in detail.

The other embodiments will be described in ways they differ from the first embodiment.

FIG. 1 shows a body 20, embodied here as a cylinder. It rotates about an axis 22, which in this case is the cylinder's axis. The rotary drive for the body 20 (not shown) is supplied in accordance with the related art, for example at about 30,000 rpm. The radius of the cylindrical body is in the order of about 20 mm. Consequently, a surface of the body 20, in this case the cylinder barrel (surface), moves at a speed of about 63 m/s.

This surface 24 is at least substantially smooth except for a plurality of discontinuities 26. These discontinuities are realized as notches or grooves extending parallel to the axis 22. They have a depth of 0.5 mm for example and extend over the entire axial length of the cylinder. They are distributed substantially evenly about the circumference, for example 4-8 such discontinuities 26 are provided on the cylinder barrel shown. They have a width of about 0.5 mm.

The body 20 moves in the direction of the arrow 28. This indicates the direction of movement of the body 20. Undisturbed regions of the surface 24 of body 20 are located between two adjacent discontinuities 26 in the direction of movement. The length thereof in the direction of movement is considerably greater than the width of a discontinuity 26 measured in the direction of movement, in this case about forty times greater.

A rod made from a solid starting product 30 is in contact with the surface 24. It is pressed against this surface 24 with a f force, see arrow 32, and propelled towards it. The arrow 32 also schematically represents a feed device. This device ensures a constant supply of fresh material of the starting product 30, so that the illustrated contact between the starting product 30 and the surface 24 is substantially consistently maintained.

This contact takes place in a contact area 34, this size of which is substantially determined by the cross-section of the starting product 30 and is typically smaller than said cross-section. In the variant shown, the starting product 30 is a round rod. But it may also have a different shape that is suitable, for example, it may be embodied as a flat profile with a rectangular cross-section. In such a case, the long side of the rectangle extends parallel to the axis 22.

Considerable frictional heat is produced in the contact area 34. This results in melting of a very small, localized portion of the material of the starting product 30 close to the contact area 34. In this process, material is constantly separated, that is to say torn away from its bond with the rest of the starting product 30, and shaped. Surprisingly in view of the prior art, it was found that spherical particles are formed. These are accelerated very rapidly and exit the contact area 34 as a jet 36. They travel as far as a collecting vessel 38. As the figure shows, the plastic particles 40 leave the contact area 34 substantially tangentially and substantially perpendicularly to the starting product. They leave the contact area 34 in a wedge formation. The starting product 30 may be aligned with the surface 24 in such manner that the force vector (see arrow 32) passes through the axis 22. Drive motors that can be used are known from the related art.

In the variant according to FIG. 2, the body 20 is formed by a band which passes and runs around two rollers 42. Again, the arrow 28 indicates the direction of movement. At least one of the rollers 42 is driven. The starting product 30 may be pressed into the area of the band-like body 20 that is not supported (e.g., directly over a roller 42), as represented by the dashed lines, but it may also contact the band on the outside of a roller 42, see solid lines.

In the variant according to FIG. 3, an orbital disc is used as body 20. Here too, the direction of movement is indicated by the arrow 28. The starting product 30 is located inside a guide tube 44. The tube is stationary. The starting product 30 is supported movably inside the guide tube 44. The guide tube 44 has a free end 46 which is located in close proximity to the surface 24. Consequently, the starting product 30 is not guided, e.g., laterally unsupported, only for the shortest possible distance between the free end 46 and the surface 24. It sustains the reaction forces itself in this small area. Otherwise, the forces are absorbed (at least on part) by the guide tube 44. The design according to FIG. 3 is therefore suitable, in at least some embodiments, for less solid starting product 30.

Finally, FIG. 4 shows the interaction between the apparatus and an extruder 48. The extruder delivers warm plastic material as starting product 30, which is guided through a guide tube 44 which is in contact with a rotating disc, which forms the body 20 as in the variant according to FIG. 3. In this variant, the guide tube 44 may be eliminated if the starting product 30 is sufficiently stable.

The body 20 is made from metal, for example, e.g., from stainless steel. It may also be manufactured from a ceramic or other suitable material.

In a method for producing powdery plastic particles, a starting product 30 of plastic, for example, a viscous to solid starting product 30, is brought into contact with a smooth surface 24 of a body 20 which is moved at a speed v of at least 5 m/s relative to the starting product 30. In the contact area 34 between starting product 30 and body 20, the starting product 30 is heated locally and is flung in powdery form out of the contact area 34 in the direction of movement (substantially) of the body 20.

The higher the heat deflection temperature (HDT) is, see DIN EN ISO 75-1 to 3, the better the sprayability of the powdery form. The heat deflection temperature may be above 100° C. This makes it possible to spray as well without cooling. The effect of this is that threads do not form and the undesirable coarse material remains in a reasonable proportion to the desirable quantity of fine material, that is to say, the powdery plastics obtained.

The lower the heat deflection temperature is, the smaller the contact area may be, that is to say the "heating area," relative to the surface of the body, also called the "transport area."

The lower the heat deflection temperature is, the slower the speed v can be used. In this way, it is possible to prevent too large a quantity from melting, which cannot be transported away.

The contact area in at least some embodiments is not be coated or covered with the plastic while the method is proceeding, but rather remains largely free thereof. Coating of the contact area of the roller for example is not to be considered a problem in and of itself. But if the charge becomes excessive, threads may form.

With a soft starting product and otherwise identical parameters, the size of the projections and/or recesses—the latter also being called depressions—has a greater effect on the grain size distribution than with a harder starting product. The wider the depressions are counter to the direction of rotation of the roller, the coarser the powder is.

The following is true for a soft (relatively) starting product: The smaller the part of the smooth surface of the body is, that is to say, the part without projections and/or recesses, the less the body—the roller for example—becomes coated.

The ratio between smooth surface part and depressions may be selected such that the starting product which is melted by contact with the smooth surface part is transported away by the depressions and can be separated subsequently.

The higher the heat deflection temperature is, the more spherical the plastic particles are. This temperature may be above 110, for example, above 125, above 150 in at least some embodiments, and even above 175° C. in at least some embodiments.

Even fibrous powder can be flowable by avoiding sharp edges and corners. The size of the parts is less important. This was demonstrated experimentally with TPU (thermoplastic polyurethane), which could not be screened at 125 μm, and hardly at all at 500 μm. Accordingly, particle sizes from >500 μm up to 20,000 μm (coarse material) were present. A flow behavior was revealed that exhibits only minimal tendency to break off even without additives.

Under otherwise identical conditions, as the starting product cools progressively, that is to say, as the temperature of the starting product falls, the grain distribution becomes coarser. This is counteracted by means of higher speed v, for example, the rotating speed of the roller 20. When the speed v was increased from 60 to 160 m/s, in a test a powder was obtained with a 3+ finer grain distribution, e.g., which is three times as fine. With increases in the range from 50 up to 250 m/s for soft materials (heat deflection temperature <100° C.) with N2 cooling, the ratio appears to be almost linear.

The starting product may be cooled, for example, to a temperature below minus 50° C., or less than minus 100° C. in at least some embodiments, e.g., approximately to the temperature of liquid nitrogen. In at least some embodiments, it is not the body 20, for example the roller, that is cooled, but the starting product. In this way, the determining process of the method, that of the formation of the thinnest possible melt layer is achieved before it is transported away by the depressions.

A purely mechanical removal, such as occurs for example when metal is filed with a file or a metal workpiece is ground with a grinding disc, is less desirable. The differentiation from mechanical removal is defined in that for a very short period (<1 sec) the material is fused and/or melted.

The roller 20 may be charged with multiple starting products spread around the circumference thereof, e.g., contacted by three starting products each offset by an angle of 120 degrees. This is possible because most products are separated quickly from a roller that constitutes the body and guided by airflows.

The starting product can be moved against the body, such as with the roller with pressure or a certain force. In this context, the rate can be measured such that the starting product does not melt over too large an area, which results in coarse material, but at the same time it is hard enough to support the feeding effect of the roller. The force may be in the range from 1000 N to not more than 100,000 N, depending on the material.

The more dimensionally stable the starting product is at elevated temperatures, the greater the pressure or force may be. Then, an effect is initiated which looks like "smoke." This typically consists of particles in the range below 30 μm. Softer materials tend more often to be "entrained" by the roller 20.

Starting product which is dimensionally stable at elevated temperatures, e.g., with a heat deflection temperature >100° C., may, in at least some embodiments, be placed against the middle of the roller. Material with a heat deflection temperature below 100° C. may be applied to the roller in the case of warm spraying (i.e., without cooling), or with cold spraying, may be treated similarly to material with a heat deflection temperature >100° C. A warm spraying process is understood to mean spraying without cooling.

Spraying with velocity v below 50 m/s is possible, but not as economically advantageous, because the contact area for melting would have to be large, and consequently, too little feed power would be available.

The depressions may be in the shape of a spherical segment. They are also called dimples. Depressions of such kind are also found on golf balls, for example. A roller with dimples enables finer atomization than other geometric configurations of the depressions due to the constantly changing centrifugal forces within the circle of the dimples.

While the method is being carried out, the roller 20 takes on an end temperature specific to the material, but, however, this should always be below the melting point of the starting product. It is usually not necessary to provide external cooling of the roller.

With starting products that are dimensionally stable at elevated temperatures (>100° C.), the fineness of the X10, X50, X90 fraction only varies slightly, in the range from 10-20%, as the circumferential speed v of the roller increases. The larger the value v becomes, the finer the fractions become. The quantity of powder/h increases with speed v if the pressure is increased at the same time. However, the pressure does not increase linearly, but rather in the range from ½-⅓.

Both cooled starting product and starting products which have a heat deflection temperature of >100° C., yield a grain distribution in the range from X10:25 X50:60 X90:95 X99: 115 with individually economical settings in terms of pressure, circumferential speed and cooling in each case, the powder having been screened at 125 μm.

The higher the heat deflection temperature is above 100° C., the less cooling is necessary for the starting product. A low heat deflection temperature of the starting product may be replaced to a certain degree by cooling to lower temperatures. In general, it is advantageous if the starting product has low thermal conductivity.

It is advantageous if the starting product is porous, for example has small air inclusions or exists as foam. Porosity, etc., encourages the spraying process because the air inclusions have the effect of reducing the effective area in the contact area, and therewith the area that is melting at the same time, thus providing the conditions for generating smaller plastic particles. At the same time, the pressure or force exerted by the starting product on the roller can be increased as a consequence of its lower friction.

Starting product that has a softening temperature higher than 100° C. and is generally suitable for warm spraying, that is to say, without additional cooling, becomes coarser and more fibrous if liquid gas is used for cooling. In this case, the cooling prevents the formation of the a melt film, and the material is rather removed by abrasion instead. Although it may be discerned that it was briefly molten, this phase was too short to lead to the formation of economically useful quantities of spherical particles in a range below 125 µm.

Porous starting product does not reduce the bulk density pSch of the end product during spraying. (Porous PEKK yielded a bulk density of 265/Solid PEKK yielded a bulk density of 270 with similar grain size distribution). See Table 1:

Maximum Circumferential Speed v in m/s

| Heat deflection temperature in ° C. | warm | cooled with N2 to below O° C. to −150° C. |
|---|---|---|
| >100 | 200+ | 200+ (then coarser and more fibrous than warm) |
| <100 | 50-100 (coarser and more fibrous than cold) | 100-200+ |

The method not only enables the production of powders from starting products which are very difficult or impossible to grind. It also yields powder with a desirable spherical shape as close to spherical as possible. It has the effect of increasing flowability as well as bulk density and tamped density (see nid=106849980X).

The method is also suitable for filled starting products which also lend themselves very poorly to grinding because of their filling, or in which the filling would be destroyed. These include for example fibers such as GF (glass), CF (carbon), but may also be iron components, magnetite or the like. This enables plastic parts made of reinforced material or also conductive materials, e.g., sintered (SLL, SLA), to be processed as well.

The method has previously been performed successfully with the following starting products: PP, HDPE, POM, TPU, PEEK, PEKK, PEI, PPS. Previously sprayed powders with filling: PPS+glass fiber, PEKK+carbon fiber, PEKK+magnetite.

When sprayed, TPU—which is known to tend to clump after conventional grinding and is first allowed to rest for up to 48 hours before satisfactory pouring behavior is obtained—does not exhibit this complication when the methodsherein are used, and it is immediately flowable and capable of being processed. This is without any extra additives. Thus, if any additives are desirable subsequently, the quantity of the additive can be reduced, resulting in improved melting behavior and better properties in the end product. This represents a significant advantage for SLL, SLA as well as for slushes.

For products with a low heat deflection temperature (below 100° C.), additional cooling can be carried out using liquid gas, CO2 or N2.

For products with a high heat deflection temperature (above 100, above 150° C., etc.) a high energy input may be needed in order to melt enough starting product (also called material) during the short contact time. It may therefore be desirable to attempt to minimize additional cooling.

In the method, the starting product may be only melted very briefly and only at temperatures close to the (lower) melting point. Consequently, the chemical property of the material is only minimally inhibited. This was demonstrated for PEKK by means of DSC. Hardly any polymer degradation occurs. By the nature of the method, the powder is amorphous. If crystallinity is desired, it must be adjusted subsequently, as those of ordinary skill in the art should understand.

In order to obtain more spherical plastic particles and so increase the bulk weight, the powder produced can be melted in freefall in a gravity chamber immediately following the method and using its heat and by introducing additional heat. In this process, the outer shell of the plastic particles is melted and improved spherical structures form. The gravity chamber may be flared conically to prevent sticking to its edge. In addition, the temperature to which the air in this chamber is heated may be at a temperature 25% higher than the actual melting temperature of the starting product, so that the chamber does not have to be extended to gain the necessary exposure time. By sufficient air routing, the plastic particles have enough space to melt singly and not stick together, unless this effect were intended in a deliberate attempt to reduce the fine content <5 μm by agglomeration. After the selected fall distance, depending on the thermal capacity of the starting product it is advisable to cool the powdery material obtained promptly with liquid gas N2 or CO2 so that the material can be screened.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A method comprising:

producing powdery plastic particles having a substantially spherical structure, including:

contacting a stationary, plastic starting product in non-powdery form with a surface of a body; and moving the body with a speed of at least 5 m/s relative to the starting product, thereby locally heating the starting product in a contact area between the starting product and the body, and transporting resulting powdery plastic particles out of the contact area substantially in a direction of movement of the body.

2. The method according to claim 1, wherein the body defines a cylinder rotatable about an axis thereof, and the contacting step includes contacting the starting product with a cylinder barrel of the cylinder or a circular cylindrical area of the cylinder.

3. The method according to claim 1, wherein the surface of the body defines discontinuities defining one or more of projections or recesses.

4. The method according to claim 3, wherein the discontinuities, in the direction of movement of the body, are shorter than 10% of a distance between two adjacent discontinuities.

5. The method according to claim 4, wherein the discontinuities in the direction of the movement of the body are shorter than 5% of said distance between two adjacent discontinuities.

6. The method according to claim 1, wherein the speed is at least 10 m/s.

7. The method according to claim 1, wherein the contacting step includes pressing the starting product against the body with a force of least 1 N.

8. The method according to claim 1, wherein an average grain size of the powdery plastic particles is larger than a maximum roughness of the surface of the body.

9. The method according to claim 8, wherein the average grain size of the powdery plastic particles is at least ten times larger than the maximum roughness of the surface of the body.

10. The method according to claim 1, wherein the surface of the body is curved and the transporting step defines a wedge-shaped exit area for receiving transported powdery plastic particles extending from the contact area.

11. The method according to claim 1, further comprising collecting the plastic particles with a collecting vessel located behind the body in the direction of movement of the body.

12. The method according to claim 1, comprising selecting one or more of a material of the body or the speed such that substantially no amount of the starting product adheres to the surface during the producing step.

13. The method according to claim 1, further comprising movably guiding the starting product within a guide tube surrounding the starting product, and supporting the starting product to the surface of the body from an end of the guide tube proximate to the surface of the body without the guide tube contacting said surface.

14. The method according to claim 1, wherein the contacting step includes delivering the starting product into contact with the body with an extruder defining an exit area thereof configured for discharging the starting product therefrom located close to the body.

15. The method according to claim 1, wherein the starting product defines a viscous to solid starting product.

16. A device comprising:
    a body having a surface, wherein the body is movable with a speed v of at least 5 m/s;
    a viscous to solid plastic starting product in non-powdery form in contact or contactable with a contact area of the surface;
    wherein the device is configured to produce powdery plastic particles having a substantially spherical structure, by performing the following steps:
        contacting the starting product with the surface of the body; and
        moving the body with the speed of at least 5 m/s relative to the starting product, thereby locally heating the starting product in the contact area between the starting product and the body, and transporting resulting powdery plastic particles out of the contact area substantially in a direction the movement of the body; and
    a collecting vessel located sufficiently close to the contact area to substantially collect the powdery plastic particles.

17. The device according to claim 16, further comprising a guide tube configured to movably guide the starting product therein and defining a free end sufficiently proximate to the contact area of the surface to support the starting product from the end of the guide tube to the surface without the guide tube contacting said surface.

18. The device according to claim 16, further comprising an extruder defining an exit area thereof located sufficiently close to the contact area to deliver plastic material forming the starting product therefrom into contact with the surface.

* * * * *